Patented Oct. 3, 1933

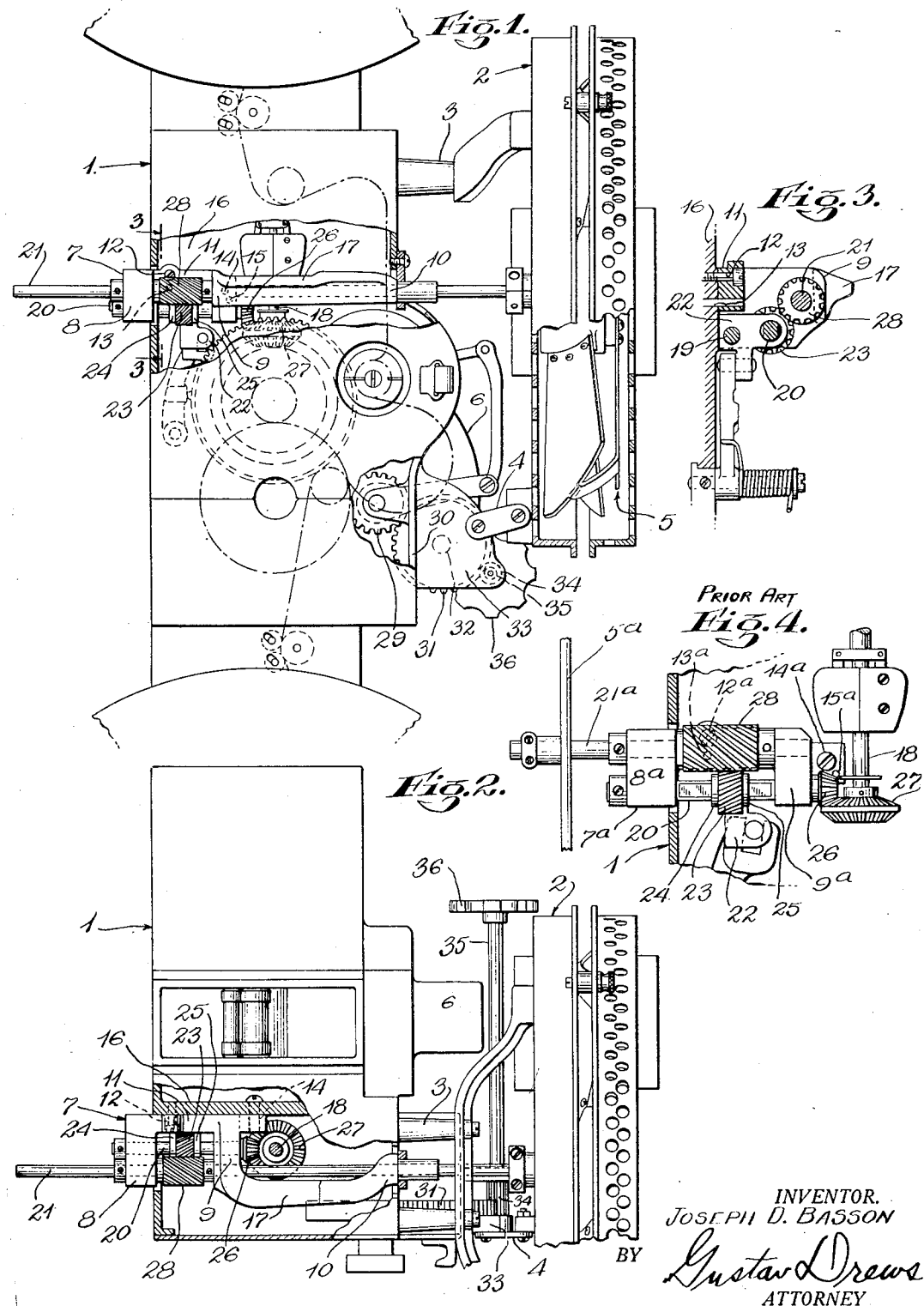

1,928,659

UNITED STATES PATENT OFFICE 1,928,659

SHUTTER ATTACHMENT FOR PROJECTORS

Joseph D. Basson, Brooklyn, N. Y.

Application October 29, 1930. Serial No. 491,849

4 Claims. (Cl. 88—17)

This invention relates to projecting machines in general and more especially to the Simplex projector heretofore extensively used.

With the projecting machines of the type known as the Simplex heretofore in use, the shutter has been placed on the front of the machine, that is the side remote from the lamp. With this arrangement ready access was had to the film and to the mechanism for framing the film which is located on the side of the projector facing the lamp.

With the projectors extensively used until recently such as the original Simplex projector, the lamps used seldom exceeded twenty-five amperes. With the innovation of the new lamps of high intensity of one hundred and fifty to two hundred and twenty-five amperes for the new projectors and of the improved reflectors used therewith, it is not unusual to obtain a heat approximating eleven hundred degrees Fahrenheit at the light aperture. To dissipate this heat at the light aperture as quickly as possible and thereby reduce the fire hazard, resort has been had to many expedients, amongst others, circulators for withdrawing the heat, air blowers and the like. To this end, the location of the shutter at the rear of the projector between the lamp and the projector has also been attempted.

Due to the expense of the projector such as the Simplex type, attempts have been made to preserve as much of the old projector as possible when relocating the shutter. To this end, the present invention aims to provide an improved attachment whereby a minimum number of parts need be replaced at a minimum cost.

It is not new to change the position of the shutter from the front to the rear of the projector. Effectively so to change the position of the shutter, among other expedients, arrangements have been provided whereby an additional gear is added to mesh with the old transmission gears of the driving shaft of the shutter heretofore in use to drivingly connect the new shaft for the repositioned shutter. With this expedient, experience has taught however that due to the wear of the old gears, it is practically impossible merely to add a single new gear and as a result thereof, it has generally been necessary to discard the old gears and introduce a complete new set of three gears. To this end, the present invention aims to provide an arrangement in which the shaft location of one of the old gears is changed and extended to clear the adjoining mechanism so that the extended shaft will pass to the rear of the machine to receive the shutter at such location, additional gears thus be dispensed with, and consequently the old gears used without danger of meshing in misalinement.

It is still another object of the present invention to provide an attachment by means of which the old gears for the shutter may be used without danger of misalinement and in addition thereto no new connecting screw openings formed in the projecting machine housing proper, but instead thereof the old screw openings formerly used with the former attachment, now used with the new attachment.

These and other features, capabilities and advantages of the invention will appear from the subjoined detail description of one specific embodiment thereof illustrated in the accompanying drawing in which:

Figure 1 is a fragmental side elevation partly broken away of a projector made according to the present invention;

Fig. 2 is a fragmental plan of a projector made according to the present invention;

Fig. 3 is a section on the line 3—3 of Fig. 1 and

Fig. 4 is a fragmental view of a projector made according to the design heretofore in use.

In the embodiment illustrated in Figs. 1, 2 and 3, there is provided a projector housing 1 having a shutter housing 2 adjacent thereto connected to the rear face of the projector housing 1 by the connecting devices 3 and 4.

The shutter 5 in the present instance mounted in the shutter housing 2 is of the type illustrated in my co-pending application, Serial No. 463,467, serving not only as a shutter for the projector but also as a fan or a heat extracting element for dissipating the heat from the light aperture formed in the extension 6 of the projector housing 1.

On one side of the housing 1, there is formed a bracket 7 having a front journaled portion 8 adjacent to the front face of the projector housing 1, an intermediate journaled portion 9 and a rear journaled portion 10 adjacent to the rear face of the projector housing. The bracket 7 has a connecting portion 11 which is provided with a screw opening 12 and a stud opening 13 between the journaled portions 8 and 9 and a screw opening 14 and a stud opening 15 to the rear of the journaled portion 9. These screw and stud openings 12, 13, 14 and 15 are formed to register with the screw openings formed in the plate 16 of the projector housing 1 for the bracket that has been removed. The bracket 7 also has a connecting arm 17 extending outwardly from the journaled portion 9 to clear the vertical driving shaft 18 and appurtenant parts and extend to the journaled portion 10.

The journaled portions 8 and 9 are provided with three pairs of alined openings, a pair of alined openings for the connecting pin 19, a second pair of alined openings for the shaft 20 and a third pair of alined openings for the shaft 21. The pin 19 is used to connect the bracket 22 in place between the journaled portions 8 and 9. The shaft 20 has mounted thereon, the worm gear 23 slidable relative to the shaft between the cheeks 24 and 25 of the bracket 22 which are located between the journaled portions 8 and 9 but fixed to rotate with the same. The shaft 20 is also provided fixedly to support the beveled gear 26 rearwardly of the journaled portion 9 to mesh with the beveled gear 27 on the vertical shaft 18.

The shaft 21 extending through the third pair of alined openings in the journaled portions 8 and 9 extends also through the journaled opening in the journaled portion 10 to and beyond the rear face of the projector housing 1 fixedly to receive the shutter device 5.

Between the journaled portions 8 and 9, there is fixedly secured on the shaft 21, the worm gear 28 in mesh with the worm gear 23 whereby motion is transmitted from the vertical shaft 18 to the shaft 20 and then to the shaft 21 and the shutter device 5.

As shown in Fig. 3, the shaft 21 is disposed outwardly of the shaft 20 relative to the projector housing 1. This location of the shaft 21 is arranged so that the shaft may, as indicated in Fig. 2, clear the vertical shaft 18 and appurtenant parts.

Of the standard type of projectors heretofore in use, see Fig. 4, the gears 28, 23 and 26 are retained. The shaft 21 of the new arrangement, however, is substituted for the shaft 21a of the old arrangement on which the shutter 5a was mounted to the front of the projector housing 1, and the bracket 7 of the new arrangement substituted for the old bracket 7a. The old bracket 7a had four screw and stud openings 12a, 13a, 14a and 15a similar to the screw and stud openings 12, 13, 14 and 15 of the new bracket 7 to aline with the screw openings formed in the projector housing 1.

The old bracket 7a had only two journaled portions 8a and 9a corresponding to the journaled portions 8 and 9 but not provided with any connecting arm corresponding to the arm 17 nor any journaled portion such as the journaled portion 10 of the new bracket 7.

Furthermore, the old bracket 7a was provided with three sets of shaft openings, one set of shaft openings corresponding substantially in position to the position of the pin 19 of the new bracket 7, a second pair of shaft openings corresponding substantially in position to the position of the openings for the shaft 20 of the new bracket 7. Since the shaft 20 and appurtenant parts are not replaced but the identical portion used with the old bracket 7a, it will be designated as 20 in the old bracket the same as in the new bracket. The pair of shaft openings, however, for the shaft 21a are different than the shaft openings for the shaft 21 of the new bracket. In the old bracket, see Fig. 4, the shaft 21a is disposed directly above the shaft 20 and since it does not extend to the rear of the journaled portion 9a it need not clear the vertical shaft 18 and consequently it is not disposed outwardly of the shaft 20 relative to the projector housing 1.

From the foregoing, it will thus be seen that the projector housing 1 of the standard type need not be reconstructed, the same screw openings for the bracket 7a used for the new bracket 7 and that no parts of the old projector housing 1 need be rechanged to provide for the new bracket 7.

Furthermore, since the gears 23, 26 and 28 mesh with the same gears in the new arrangement as in the old arrangement, the same identical gears may be retained providing a material saving in cost both with respect to labor and cost of parts.

Preferably as indicated in Figs. 1 and 2, the gear 29 of the standard projecting machine there used for controlling the framing device, instead of being operated by a worm mounted on a shaft extending through the plate 30, now meshes with the gear 31 mounted on the shaft 32 which gear meshes with a pinion 34 on a shaft 35, the shafts 32 and 35 being journaled in a bracket 33. The shaft 35 as shown in Fig. 2 is preferably provided with a handle 36 extending beyond the edge of the shutter housing 2 whereby access to the same is readily had.

It is obvious that various changes and modifications may be made to the details of construction without departing from the general spirit of the invention as set forth in the appended claims.

I claim:

1. The combination with a moving picture apparatus having a vertically extending wall plate and drive parts including a vertically extending shaft mounted on one side of said wall plate, of an S-shaped bracket detachably secured to said wall plate and having two arms, one of said arms being disposed adjacent to said wall plate and secured thereto and the other of said arms extending clear of said drive parts in its passage to the rear end of said wall plate, and two horizontally extending shafts rotatably mounted in said bracket, one of said horizontally extending shafts being drivingly connected to said vertically extending shaft and the other of said horizontally extending shafts being drivingly connected to said first horizontally extending shaft and extending within the second of the arms of said bracket clear of said drive parts in its passage to the rear end of said wall plate for drivingly mounting a shutter at such rear end of said wall plate.

2. The combination with a projector having a vertically extending wall plate, a U-shaped bracket on one face of said wall plate adjacent to the front end thereof, and drive parts including a vertically extending shaft mounted on said face of said wall plate adjacent to the rear end thereof, of an S-shaped detachable bracket to replace said U-shaped bracket including an arm secured to said wall plate adjacent to the front end thereof, a second arm extending horizontally to and beyond the rear end of said wall plate and clear of said drive parts, a journaled portion at the front end of said first arm, a second journaled portion forming the connecting portion between said arms, a third journaled portion at the rear end of said second arm, and two horizontally extending shafts, one of said horizontally extending shafts being drivingly connected to said vertically extending shaft and journaled in said first and second journaled portions, the other of said horizontally extending shafts being drivingly connected to said first horizontally extending shaft and being journaled in all three of said journaled portions and extending clear of said drive parts in its passage to and beyond the rear end of said wall plate to drivingly support a shutter at the rear end of said wall plate.

3. The combination with a projector having a vertically extending wall plate with a plurality of screw openings therein, a U-shaped bracket having a horizontally extending arm equipped with screw openings to register with the screw openings in said wall plate to receive fastening screws to secure said bracket to one face of said wall plate at the front end thereof, and drive parts including a vertically extending shaft mounted on said face of said wall plate adjacent to the rear end thereof, of an S-shaped detachable bracket to replace said U-shaped bracket including an arm equipped with screw openings to register with the screw openings in said wall plate to receive fastening screws, a second arm extending horizontally to and beyond the rear end of said wall plate and clear of said drive parts, a journaled portion at the front end of said first arm, a second journaled portion forming the connecting portion between said arms, a third journaled portion at the rear end of said second arm, and two horizontally extending shafts, one of said horizontally extending shafts being drivingly connected to said vertically extending shaft and journaled in said first and second journaled portions, the other of said horizontally extending shafts being drivingly connected to said first horizontally extending shaft, and being journaled in all three of said journaled portions and extending clear of said drive parts in its passage to and beyond the rear end of said wall plate to drivingly support the shutter at the rear end of said wall plate.

4. The combination with a projector having a vertically extending wall plate, a U-shaped bracket having a horizontally extending arm adapted to be attached to one face of said wall plate at the front end thereof, drive parts including a vertically extending shaft mounted on said face of said wall plate adjacent to the rear end thereof; of an S-shaped detachable bracket to replace said U-shaped bracket including an arm adapted to be attached to said wall plate at the front end thereof, a second arm extending horizontally to and beyond the rear end of said wall plate and clear of said drive parts, a journaled portion at the front end of said first arm, a second journaled portion forming the connecting portion between said arms, a third journaled portion at the rear end of said second arm; two horizontally extending shafts, one of said horizontally extending shafts being drivingly connected to said vertically extending shaft and journaled to said first and second journaled portions, a gear on said first horizontally extending shaft, and a gear on said second horizontally extending shaft in mesh with the gear on said first horizontally extending shaft, said second horizontally extending shaft being journaled in all three of said journaled bearings and extending clear of said drive parts in its passage to and beyond the rear of said wall plate to drivingly support a shutter at the rear end of said wall plate.

JOSEPH D. BASSON.